(12) United States Patent
Ovshinsky et al.

(10) Patent No.: US 6,378,601 B1
(45) Date of Patent: Apr. 30, 2002

(54) HYDROGEN COOLED HYDROGEN STORAGE UNIT HAVING A HIGH PACKING DENSITY OF STORAGE ALLOY AND ENCAPSULATION

(75) Inventors: Stanford R. Ovshinsky; Rosa T. Young, both of Bloomfield Hills, MI (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 0 days.

(21) Appl. No.: 09/570,314

(22) Filed: May 12, 2000

(51) Int. Cl.[7] ............................................. F28D 15/00
(52) U.S. Cl. ..................... 165/104.12; 165/DIG. 902; 62/477; 62/480; 62/46.2; 420/900
(58) Field of Search .................. 165/104.12, DIG. 902, 165/10; 62/477, 480, 46.2; 420/402, 407, 900

(56) References Cited

U.S. PATENT DOCUMENTS

| | | | | |
|---|---|---|---|---|
| 933,152 A | * | 9/1909 | Avery | 165/104.12 |
| 2,042,635 A | * | 6/1936 | Schellens | 29/89.045 |
| 3,315,479 A | * | 4/1967 | Wiswall, Jr. et al. | 165/104.12 |
| 3,375,676 A | * | 4/1968 | Wiswall, Jr. et al. | 165/104.12 |
| 3,508,414 A | * | 4/1970 | Wiswall, Jr. et al. | 165/104.12 |
| 3,922,872 A | * | 12/1975 | Reilly et al. | 62/48 |
| 4,133,426 A | * | 1/1979 | Turillon et al. | 165/104.12 |
| 5,475,723 A | * | 12/1995 | Marlowe | 376/416 |
| 5,778,972 A | * | 7/1998 | Sapru et al. | 165/104.12 |
| 6,193,929 B1 | * | 2/2001 | Ovshinsky et al. | 420/402 |

* cited by examiner

*Primary Examiner*—Henry Bennett
*Assistant Examiner*—Terrell McKinnon
(74) *Attorney, Agent, or Firm*—David W. Schumaker; Marvin S. Siskind

(57) ABSTRACT

A hydrogen cooled hydrogen storage unit. The unit employs excess hydrogen flow between hydrogen storage alloy rods in the hydrogen storage unit in order to provide convective cooling thereof. The unit provides for high packing density of the storage materials. The unit also allows for efficient thermal transfer of heat energy from a central source of heat through the rods thereof during discharge of the stored hydrogen. The hydrogen storage rods of the unit are encased in an encapsulant layer which prevents entrainment of the hydrogen storage material in the high flow rate hydrogen.

16 Claims, 4 Drawing Sheets

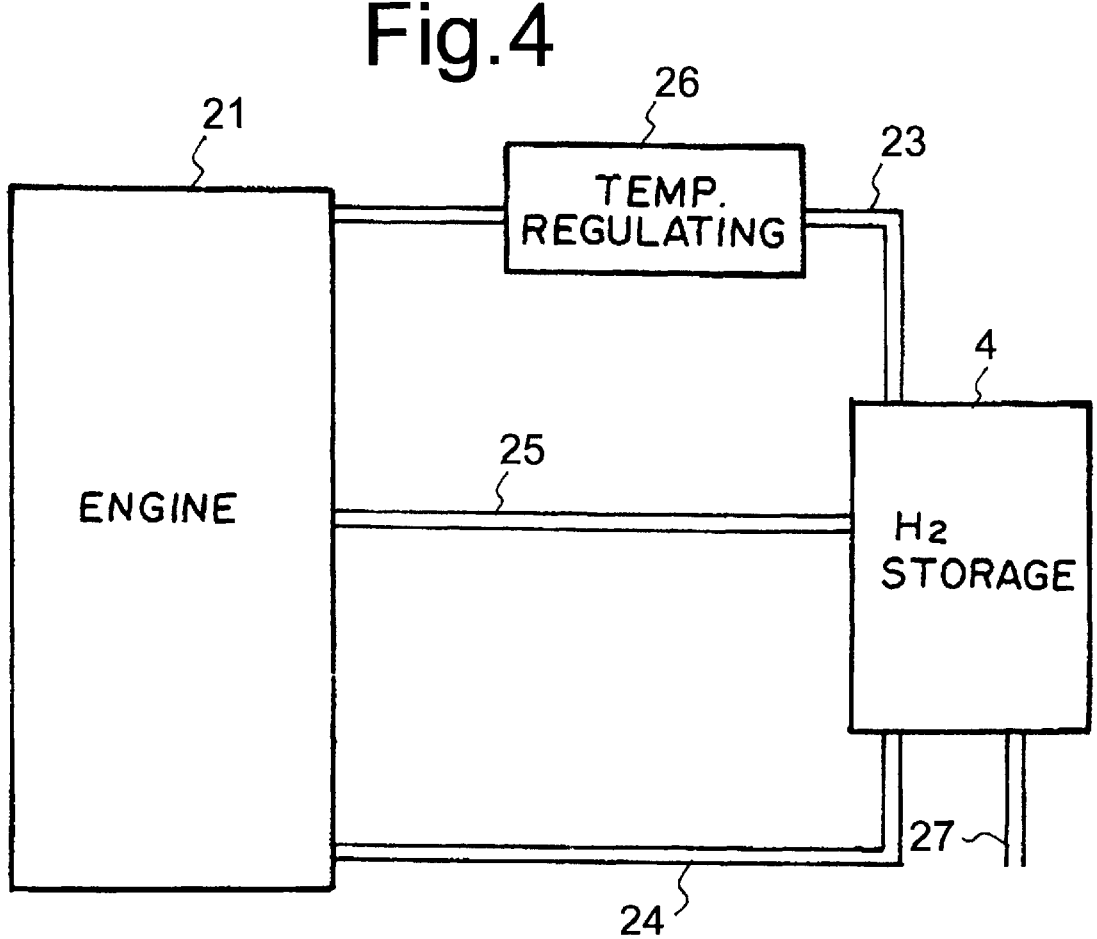

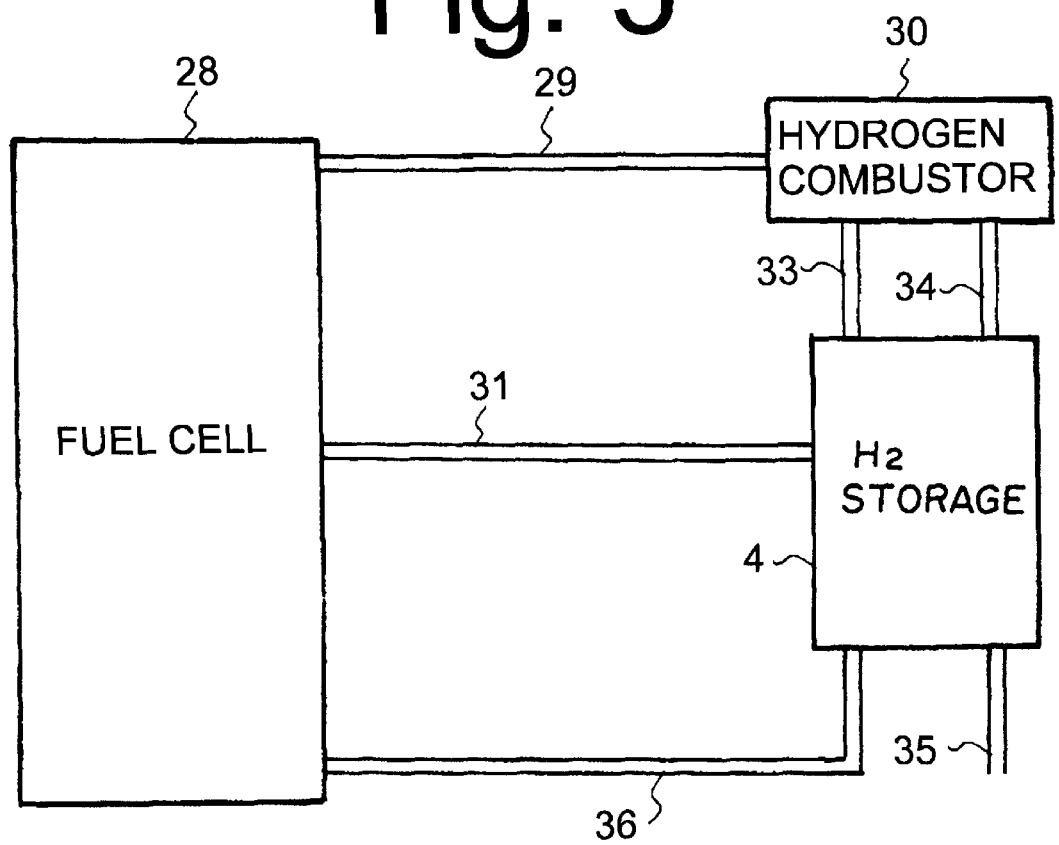

HYDROGEN COOLED HYDROGEN STORAGE UNIT HAVING A HIGH PACKING DENSITY OF STORAGE ALLOY AND ENCAPSULATION

FIELD OF THE INVENTION

The instant application relates to hydrogen cooled hydrogen storage units, and more specifically to a unit which provides excellent heating and cooling thereof while also providing for a high packing density of the storage materials therein and encapsulation of the storage materials to prevent entrainment into the high speed cooling hydrogen flow therethrough.

BACKGROUND OF THE INVENTION

The instant patent application describes a hydrogen storage unit useful for a hydrogen-based economy. The storage unit allows for fast cooling and/or heating thereof using gaseous hydrogen as a direct, convective heat transfer medium. The unit provides excellent heating and cooling of the hydrogen storage alloy rods therein while providing for a high packing density of the storage alloy, and encapsulation of the storage alloy to prevent entrainment of the materials within he hydrogen coolant flow. The instant storage unit is useful in a hydrogen based economy.

An infrastructure for such a hydrogen based economy is disclosed in U.S. application Ser. No. 09/444,810, entitled "A Hydrogen-based Ecosystem" filed on Nov. 22, 1999 for Ovshinsky, et al. (the '810 application), which is hereby incorporated by reference. This infrastructure, in turn, is made possible by hydrogen storage alloys that have surmounted the chemical, physical, electronic and catalytic barriers that have heretofore been considered insoluble. These alloys are fully described in copending U.S. patent application Ser. No. 09/435,497, entitled "High Storage Capacity Alloys Enabling a Hydrogen-based Ecosystem", filed on Nov. 6, 1999 for Ovshinsky et al. (the '497 application), which is hereby incorporated by reference.

Hydrogen storage units have a number of requirements. First and foremost, they are required to be able to store hydrogen. This bare minimal requirement is met by many prior art storage units. However, to be commercially useful in a hydrogen based economy, the hydrogen storage unit requires many more properties. One requirement is a high specific capacity hydrogen storage material. Such materials were invented by Stanford R. Ovshinsky et al and are disclosed in the '497 application. Another requirement is a unit which has a high volumetric and gravimetric packing density of storage materials. One such unit is also disclosed in the '497 application.

A further requirement is a unit that has the ability to be cooled a high rate. This is required to be able to quickly charge hydrogen into the unit while maintaining proper operating temperature by removing the heat of hydride formation. The instant inventors have determined that maximal cooling using minimal hardware can me achieved using excess hydrogen flow though the system to remove the heat. A system which employs hydrogen cooling is also disclose in the '497 application.

In addition to being able to quickly and efficiently cool the hydrogen storage materials within the storage unit, the hydrogen storage materials must be heated quickly and efficiently to release hydrogen therefrom during use. To accomplish this, there must be efficient thermal transfer from the source thereof through the bulk of the storage material. While most systems will transfer this heat, they do not do so efficiently.

Finally, for many applications ease of capacity expansion is a must. While many prior art systems do not allow for expansion, some do. However, with most systems, expansion of the amount of hydrogen storage materials reduces the cooling and heating efficiency.

Therefor, what is needed in the art is a high capacity hydrogen storage unit having high volumetric and gravimetric storage capacity (i.e. high packing density of storage materials), which is capable of being cooled at a high rate, is capable of efficient heat transfer from an internal heat source throughout the storage material, and is expandable without losing any of the aforementioned properties.

SUMMARY OF THE INVENTION

The instant invention is a hydrogen-cooled hydrogen storage unit. The unit employs excess hydrogen flow between hydrogen storage alloy rods in the hydrogen storage unit in order to provide convective cooling thereof. The unit provides for high packing density of the storage materials. The unit also allows for efficient thermal transfer of heat energy from a central source of heat through the rods thereof during discharge of the stored hydrogen. The hydrogen storage rods of the unit are encased in an encapsulant layer which prevents entrainment of the hydrogen storage material in the high flow rate hydrogen.

The hydrogen gas cooled hydrogen storage unit includes a plurality of encapsulated hydrogen storage alloy rods disposed within a storage unit casing. The unit also includes a hydrogen flow channel region between and around the hydrogen storage alloy rods. The flow channel region provides for pathways between the rods to allow for high speed hydrogen gas flow. A portion of the hydrogen is stored within the storage material and releases its heat of hydride formation. The remainder of the hydrogen flows through the hydrogen flow channels at a sufficient mass flow rate to remove the heat of hydride formation.

BRIEF DESCRIPTION OF THE DRAWINGS

FIG. 4 shows a schematic representation of a hydrogen gas supply system for powering an internal combustion engine vehicle; and FIG. 5 shows a schematic representation of a hydrogen gas supply system for powering for a fuel cell vehicle.

DETAILED DESCRIPTION OF THE INVENTION

There is disclosed herein a hydrogen-cooled hydrogen storage unit. The unit employs excess hydrogen flow through flow channels between hydrogen storage alloy rods in the hydrogen storage unit in order to provide convective cooling of the rods. The storage unit of the instant invention provides for excellent packing density of the storage materials. The hydrogen storage alloy rods of the instant invention are covered by a porous material which encapsulates the hydrogen storage alloy, thereby preventing loose particles from escaping when using excess hydrogen flow to transfer the heat of hydride formation from the storage material to the excess hydrogen and remove it from the storage unit. The configuration of the hydrogen storage alloy rods of the instant invention and their incorporation into the unit of the instant invention allows for a high packing density of storage materials and a superior transfer of heat into and out of the rods of storage alloy.

Figure 1:
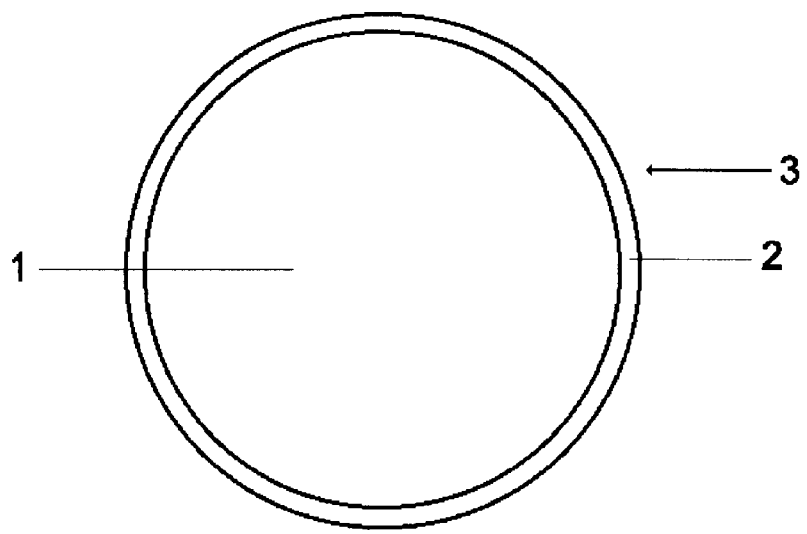
FIG. 1 is a schematic depiction, not to scale, of an encapsulated hydrogen storage rod according to the instant invention.

FIG. 1 is a cross sectional view of a schematic depiction, not to scale, of the encapsulated hydrogen storage rods 3 of the instant invention. Specifically shown are the rods of hydrogen storage alloy 1 and the porous encapsulant layer 2, which surrounds and covers the entire length of the rod.

Any alloy which safely and efficiently stores and releases hydrogen may be used to form the storage alloy rods 1 of the instant invention. Specifically useful are alloys such as Ti—Zr based room temperature hydrogen storage alloys and high capacity Mg-based storage alloys. Most useful are the high capacity, high kinetics storage alloys of the '497 application. In general the alloys contain greater than about 90 weight % magnesium, and contain at least one modifier element. The at least one modifier element creates a magnesium based alloy which is capable of storing at least 6.9 weight % hydrogen and is capable of absorbing 80% of the full storage capacity of hydrogen in under 1.5 minutes at 300° C. The modifier elements mainly include Ni and Mm (misch metal) and can also include additional elements such as Al, Y and Si. Thus the alloys will typically contain 0.5–2.5 weight % nickel and about 1.0–4.0 weight % Mm (predominantly contains Ce and La and Pr). The alloy may also contain one or more of 3–7 weight % Al, 0.1–1.5 weight % Y and 0.3–1.5 weight % silicon.

The encapsulant layer 2 which prevents entrainment of the hydrogen storage material in the high flow rate hydrogen is formed from a porous thin sheet, which is wrapped around the rod of storage material 1. While the porous sheet may be formed from polymers it is preferably composed of material which is thermally conductive, such as metals, or even thermally conductive non-metals. Examples of polymers are porous polypropylene sheet material and porous polytetrafluoroethylene sheet material. Metal encapsulants may be capable of storing hydrogen also, thereby enhancing the overall storage capacity of the system. Useful metals include Cu, Ni and Al and mixtures or alloys thereof. Useful non-metals can include thermally conductive ceramics and thermally conductive graphite materials. As in the case of metals, the non-metal encapsulant may also store hydrogen, thereby enhancing the storage capacity of the system.

Figure 2:
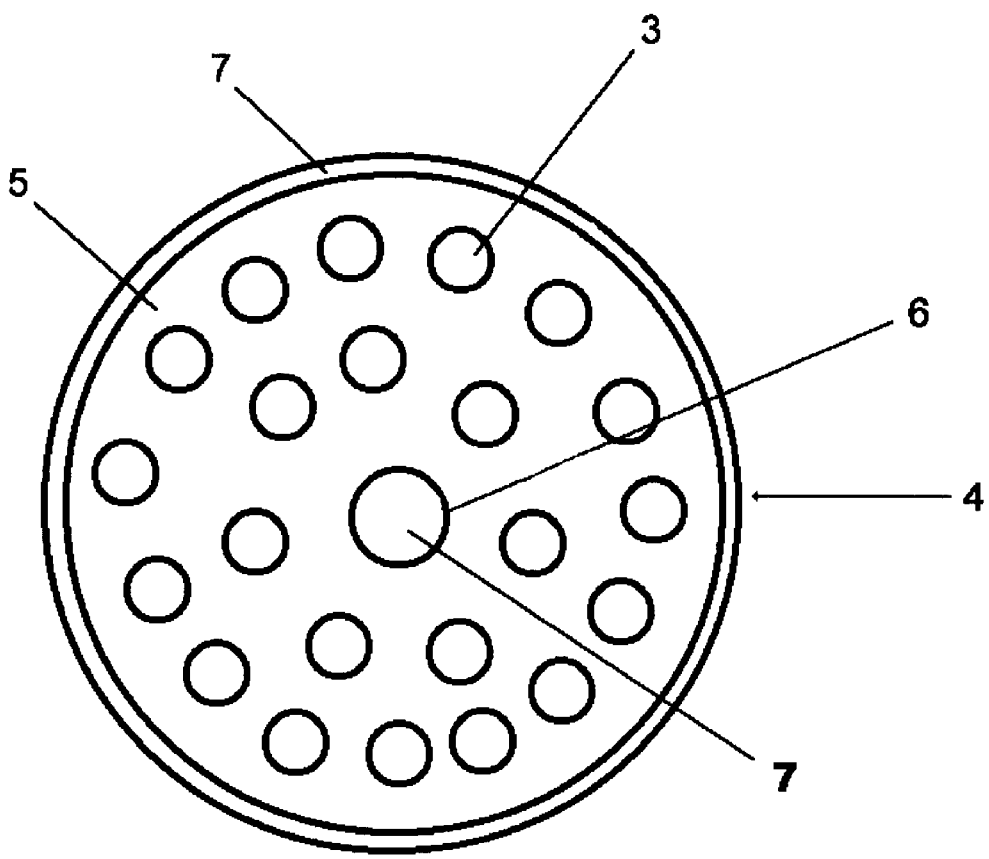
FIG. 2 is a cross sectional view of a schematic depiction, not to scale, of the hydrogen storage unit of the instant invention.

FIG. 2 is a cross sectional view of a schematic depiction, not to scale, of the hydrogen storage unit 4 of the instant invention. The unit specifically includes a casing 7, which houses the encapsulated hydrogen storage rods 3 and hydrogen flow channel region 5. The casing 4 is preferably thermally insulating to avoid unwanted heat transfer with the external environment, and is also preferably resistant to hydrogen diffusion to avoide hydrogen losses. The casing 7 includes hydrogen inlet and outlet ports (not shown), though which hydrogen flows into the unit during charging and out of the unit during charging and discharging. The unit also includes a central opening 7 and a central opening wall 6. This central opening 7 provides a location in which internal heaters may be disposed. The central opening wall 6 prevents interaction between the hydrogen/encapsulated storage rods 3/ flow channel region 5 and the interior of the central opening 7. Thus, hydrogen which is in the encapsulated storage rods 3 and flow channel region 5 cannot escape into the central opening 7, and any gases or other materials in the central opening 7 do not interact with anything within the unit. For example, one of the heating units that may be placed withing the central opening 7 is a catalytic combustor. Such a heating unit combusts a fuel source (such as hydrogen) to produce heat to release the stored hydrogen. The central opening wall prevents the fuel, oxygen and exhaust gases from escaping from the central opening 7 into the encapsulated storage rods 3 and flow channel region 5. Another type of heating unit that may be inserted into the central opening 7 is an electric heater. The central opening extends through the entire unit and is isolated from the interior of the unit via the central opening wall 6.

The hydrogen storage rods 1 are compacted from hydrogen storage alloy powder. Preferably the hydrogen storage alloy is compacted in hydride form. This is because the hydrogen storage alloys expand and contract as they are hydrided and dehydrided, respectively. When the materials are compacted in the non-hydride state, they expand during initial charging with hydrogen and then contract again when the hydrogen is removed (although not to the original size). This expansion during initial cycling causes the compacted material to disintegrate, risking entrainment of the storage material in the hydrogen flow. However, when the alloy is compacted in hydride form, all of the initial expansion is built in to the compact, thus when the material is cycled the effects of expansion/contraction is minimized. It should be noted that the compacts may be formed in the desired end shape by this process, thereby minimizing additional machining to form the final shape of the storage material. Also, any additional components of the system may be molded directly into the shape. Thus, any flow channels, or heating elements, etc. may be directly integrated with the formed shaped compact.

The storage alloy rods 1 may be of any size and shape, but preferably are in the shape of cylindrical rods. The rods are preferably between 5 mm and 6 cm in diameter, and have lengths up to 12 inches. The rods can be 100 percent dense (with respect to the hydride state) or can have porosity "built in" to compensate for expansion/contraction during cycling. Once the rods are manufactured, adding capacity to any hydrogen storage unit is as simple as packing more rods into a single or multiple casings 7.

Figure 3:
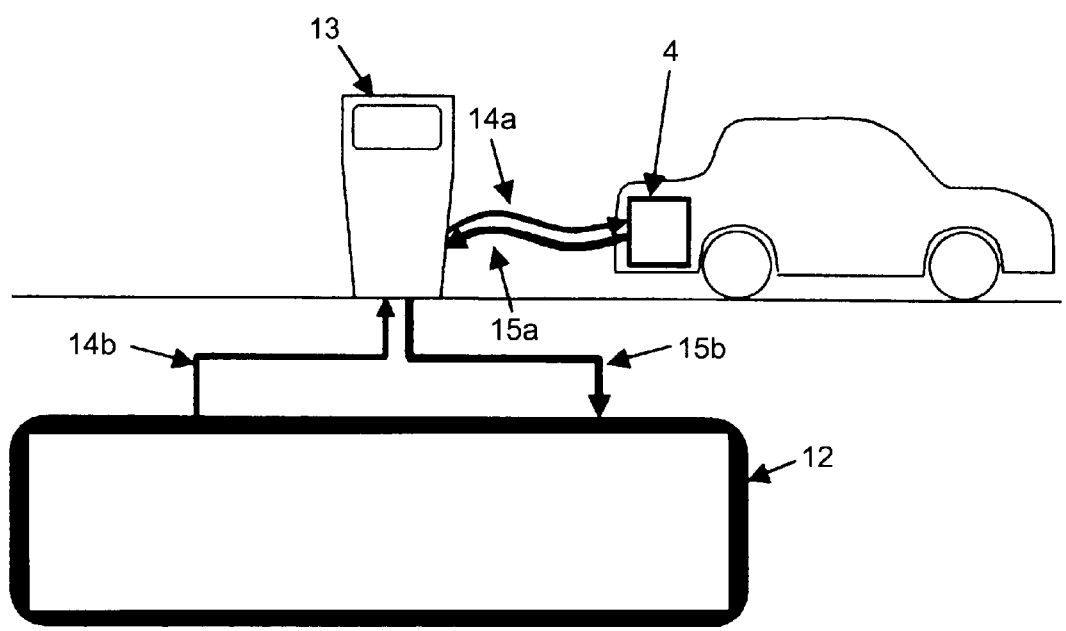
FIG. 3 is a stylistic depiction of a hydrogen refueling station.

FIG. 3 is a stylistic depiction of a hydrogen refueling station which specifically shows how hydrogen is used to capture the heat of hydride formation in the vehicles storage bed 4 and transfer that heat to the stations primary hydride storage bed 12 to assist in the release of hydrogen from the primary storage bed. Specifically, high flow rate hydrogen is dispensed from the "pump" 13 into the vehicle's hydrogen storage bed 4 through cool hydrogen supply line 14a. Some of the hydrogen is absorbed into the hydrogen storage material within the bed, thereby releasing heat of hydride formation. This heat is removed by the excess cool hydrogen. The now heated hydrogen leaves storage bed 4 and is transported to the pump 13 via hot hydrogen return line 15a. The hot hydrogen is then transported from the pump 13 to the stations primary hydrogen storage bed 12 via hot hydrogen return line 15b. The hot hydrogen releases its heat into the hydrogen storage material within bed 12 to assist in providing the required heat (heat of dehydriding) to release the stored hydrogen therein. The released hydrogen, now cooler, is supplied to the pump 13, via cool hydrogen supply line 14b, to ultimately be sent again to the vehicles hydrogen storage bed 4. This set up allows for very fast charging of a vehicles storage bed 4, and yet eliminates waste of the released heat and overheating of the bed.

Hydrogen Powered Internal Combustion Engine and Fuel Cell Vehicles

The instant storage unit is useful as a hydrogen supply for many applications. One such application is the field of automobiles. Specifically, the storage unit can be used as a source of hydrogen for internal combustion engine (ICE) or fuel cell (FC) vehicles.

FIG. 4 shows a schematic representation of a hydrogen gas supply system for an ICE vehicle, which is for supplying a hydrogen engine 21 with hydrogen gas. The system has a hydrogen gas storage bed 4 and an engine waste heat transfer supply passage 23 which leads engine waste heat (in the form of exhaust gas or engine coolant) discharged from the engine 21 to the hydrogen gas storage bed 4. The system also includes a return passage 24 for returning any engine coolant used to heat the hydrogen storage material back to the engine 21 and an exhaust gas vent 27 for releasing used exhaust gas. The system further includes a hydrogen gas supply passage 25 which leads hydrogen gas from the hydrogen gas storage bed 4 to the engine 21. The engine waste heat transfer supply passage 23 is provided with a temperature regulating unit 26 which regulates the temperature of the waste heat to be introduced into the hydrogen gas storage bed 4. With such a system, waste heat generated within the ICE can be efficiently used to heat the hydrogen storage material to release hydrogen therefrom for use in the ICE.

FIG. 5 shows a schematic representation of a hydrogen gas supply system for an FC vehicle, which is for supplying a fuel cell 28 with hydrogen gas. The system has a hydrogen gas storage bed 4 and a fuel cell waste heat/hydrogen transfer supply passage 29 which leads fuel cell waste heat and unused hydrogen discharged from the fuel cell 28 to a hydrogen gas combustor 30. Waste heat from the fuel cell may be in the form of heated gases or heated aqueous electrolyte. The hydrogen combustor 30, heats a thermal transfer medium (preferably in the form of the aqueous electrolyte from the fuel cell) utilizing waste heat from the fuel cell 28, and by combusting hydrogen. Hydrogen is supplied to the combustor 30 via unused hydrogen from the fuel cell 28, and via fresh hydrogen supplied from the hydrogen storage bed 4 via hydrogen supply line 34. Heated thermal transfer medium is supplied to the hydrogen storage bed 4 via supply line 33. The system also includes a return passage 36 for returning any fuel cell aqueous electrolyte used to heat the hydrogen storage material back to the fuel cell 28 and an exhaust gas vent 35 for releasing used combustor gas. The system further includes a hydrogen gas supply passage 31 which leads hydrogen gas from the hydrogen gas storage bed 4 to the fuel cell 28.

While the invention has been described in connection with preferred embodiments and procedures, it is to be understood that it is not intended to limit the invention to the described embodiments and procedures. On the contrary it is intended to cover all alternatives, modifications and equivalence which may be included within the spirit and scope of the invention as defined by the claims appended hereinafter.

We claim:

1. A hydrogen gas cooled hydrogen storage unit comprising:
    a storage unit casing,
    a plurality of hydrogen storage alloy rods disposed within said storage unit casing;
    a hydrogen flow channel region provided within said casing, between said hydrogen storage alloy rods, said flow channel region providing pathways between said hydrogen storage alloy rods to allow for high speed hydrogen gas flow, a portion of said hydrogen being stored within said storage material and releasing heat of hydride formation and the remainder of said hydrogen flowing through said hydrogen flow channels at a sufficient mass flow rate to remove said heat of hydride formation;
    a porous encapsulant surrounding said hydrogen storage alloy rods, thereby preventing said hydrogen storage alloy from being entrained into said high speed hydrogen gas flow.

2. The hydrogen gas cooled hydrogen storage unit of claim 1, wherein said hydrogen storage alloy rods are formed from compacted powered hydrogen storage alloy materials.

3. The hydrogen gas cooled hydrogen storage unit of claim 2, wherein said storage alloy rods are formed from compacted hydrided powered alloy materials.

4. The hydrogen gas cooled hydrogen storage unit of claim 1, wherein said rods are between 5 mm and 6 cm in diameter and are up to 12 inches in length.

5. The hydrogen gas cooled hydrogen storage unit of claim 1, wherein said porous encapsulating material surrounding said hydrogen storage alloy rods is a thin, porous sheet wrapped around said rods.

6. The hydrogen gas cooled hydrogen storage unit of claim 5, wherein said porous encapsulating material surrounding said hydrogen storage alloy plates is a thin, porous polymer sheet.

7. The hydrogen gas cooled hydrogen storage unit of claim 6, wherein said porous encapsulating material surrounding said hydrogen storage alloy plates is a thin, porous polypropylene sheet.

8. The hydrogen gas cooled hydrogen storage unit of claim 6, wherein said porous encapsulating material surrounding said hydrogen storage alloy plates is a thin, porous polytetrafluoroethylene sheet.

9. The hydrogen gas cooled hydrogen storage unit of claim 5, wherein said porous encapsulating material surrounding said hydrogen storage alloy plates is a thin, porous metal sheet.

10. The hydrogen gas cooled hydrogen storage unit of claim 9, wherein said porous metal sheet is formed from at least one metal selected from Ni, Al, Cu, and mixtures or alloys thereof.

11. The hydrogen gas cooled hydrogen storage unit of claim 5, wherein said porous encapsulating material surrounding said hydrogen storage alloy plates is a thin, porous graphite sheet.

12. The hydrogen gas cooled hydrogen storage unit of claim 1, wherein said casing is thermally insulating and resists hydrogen diffusion therethrough.

13. The hydrogen gas cooled hydrogen storage unit of claim 1, wherein said storage unit further includes an enclosed central opening disposed within the interior of said casing.

14. The hydrogen gas cooled hydrogen storage unit of claim 13, wherein said central opening is isolated from the interior of said unit via a central opening wall.

15. The hydrogen gas cooled hydrogen storage unit of claim 14, wherein said central opening houses a heating unit within said central opening wall.

16. The hydrogen gas cooled hydrogen storage unit of claim 15, wherein said heating unit is a catalytic combustor.

* * * * *